United States Patent

Shaar et al.

[11] Patent Number: 5,375,179
[45] Date of Patent: Dec. 20, 1994

[54] METHOD AND APPARATUS FOR COUPLING OPTICAL FIBERS COMPRISES DIGITIZING THE IMAGE OF FIELDS OF VIEW

[75] Inventors: Casey S. Shaar, Portland; Paul T. Schnackenberg, Beaverton, both of Oreg.

[73] Assignee: Photon Kinetics, Inc., Beaverton, Oreg.

[21] Appl. No.: 147,047

[22] Filed: Nov. 2, 1993

[51] Int. Cl.$^5$ .............................................. G02B 6/26
[52] U.S. Cl. ........................................ 385/15; 382/45; 382/34; 385/147; 385/52
[58] Field of Search ................ 382/8, 34, 45, 69, 10; 385/15, 31, 33, 34, 35, 52, 53

[56] References Cited

U.S. PATENT DOCUMENTS

| | | | |
|---|---|---|---|
| 4,265,511 | 5/1981 | Nicia et al. | 385/33 |
| 4,390,897 | 6/1983 | Smithgall, Sr. | 358/101 |
| 4,452,506 | 6/1984 | Reeve et al. | 385/52 |
| 4,721,357 | 1/1988 | Kovalchick et al. | 385/53 |
| 4,722,587 | 2/1988 | Thorsten | 350/96.2 |
| 4,984,885 | 1/1991 | Ortiz, Jr. | 356/153 |
| 4,990,770 | 2/1991 | Hemmann et al. | 250/227.24 |
| 5,094,529 | 3/1992 | Meininghaus et al. | 356/73.1 |
| 5,127,725 | 7/1992 | Mueller et al. | 356/73.1 |
| 5,140,167 | 8/1992 | Shaar et al. | 250/561 |

Primary Examiner—Rodney B. Bovernick
Assistant Examiner—John Ngo
Attorney, Agent, or Firm—Smith-Hill and Bedell

[57] ABSTRACT

A method of aligning first and second substantially parallel rod-form elements, such as optical fibers, comprises placing the first element at a position at which it is approximately aligned with the second element and is in the fields of view of two imaging systems that have respective axes that are oblique to each other and to the central axes of the two rod-form elements, and digitizing at least a part of the image of each field of view. The digital data is analyzed to determine location of the first element in each field of view, and relative displacement of the first and second elements is brought about accordingly.

12 Claims, 3 Drawing Sheets

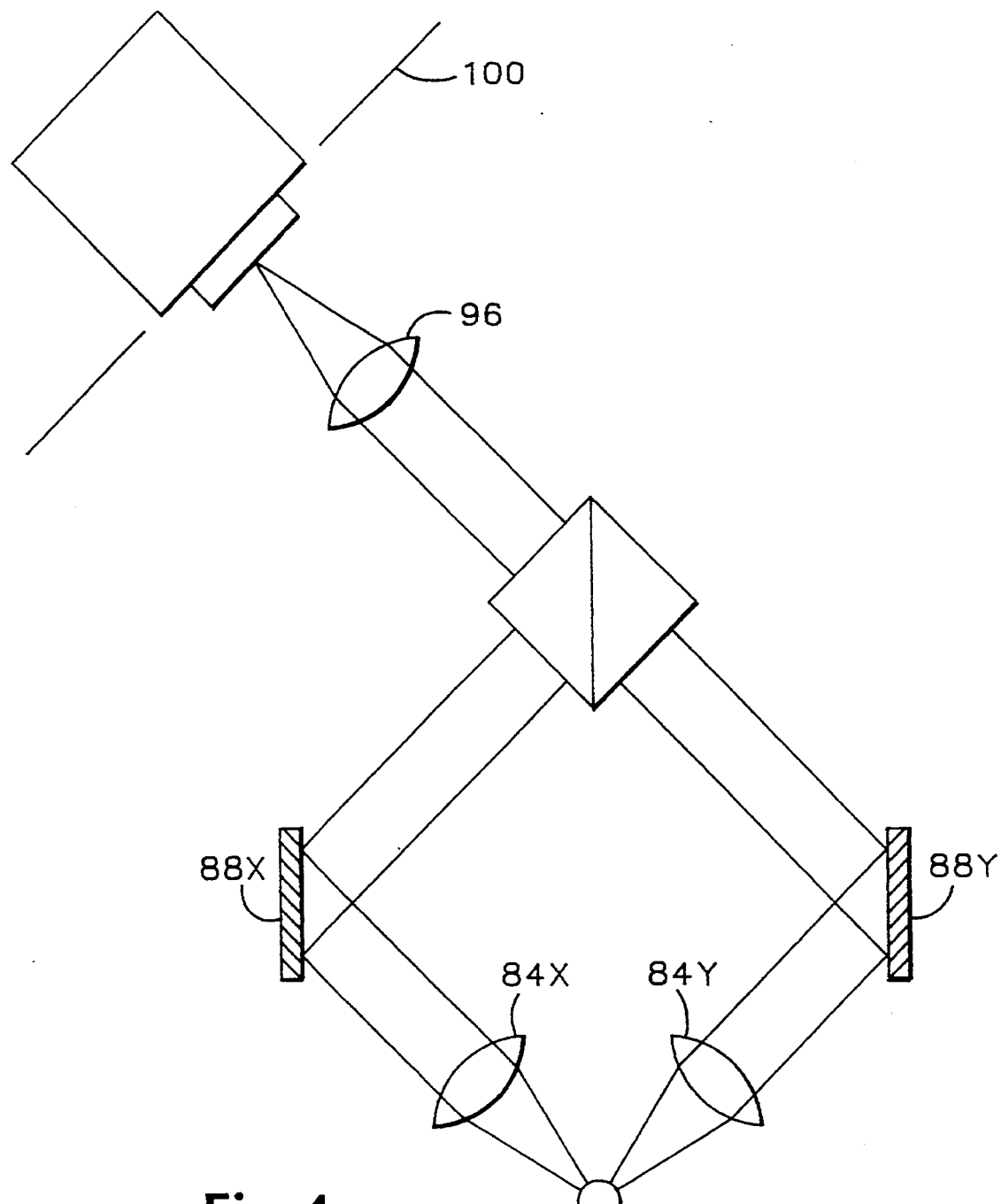
Fig.4
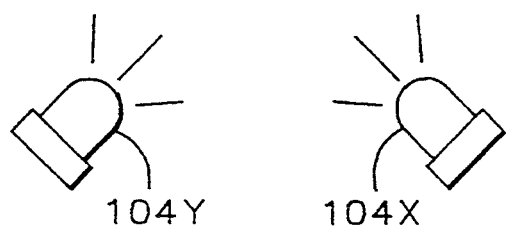

METHOD AND APPARATUS FOR COUPLING OPTICAL FIBERS COMPRISES DIGITIZING THE IMAGE OF FIELDS OF VIEW

BACKGROUND OF THE INVENTION

This invention relates to a method and apparatus for coupling optical fibers.

In the field of testing optical fibers using an optical time domain reflectometer (OTDR), it is desirable to provide optical coupling between a buffer fiber, which is connected to the optical I/O port of the OTDR, and the test fiber (the fiber that is to be tested). This coupling is achieved by bringing a distal (relative to the OTDR) end segment of the buffer fiber into coaxial relationship with a proximal (relative to the OTDR) end segment of the test fiber. Typically, the end segment of the test fiber is clamped to a base frame and the end segment of the buffer fiber is clamped to a stage that is movable along three mutually perpendicular axes, and the stage is moved while the two end segments are viewed through a microscope to bring them into the desired spacial relationship while avoiding collision between the end segments. However, this is a tedious and time consuming operation, particularly when the test fiber is one component of a ribbon fiber and it is necessary to test each component fiber separately.

A known fusion splicer, for joining optical fibers in end-to-end relationship, employs two stages for receiving end segments of the two fibers respectively and holding them in substantially aligned relationship, and machine vision apparatus for viewing the ends of the fibers and bringing about relative displacement of the fiber segments into coaxially aligned relationship and then bringing them into abutting relationship and fusing them together.

SUMMARY OF THE INVENTION

In accordance with a first aspect of the present invention there is provided a method of aligning a first rod-form member successively with a plurality of target rod-form members that are arrayed substantially parallel to each other, comprising placing the first member at a position at which it is approximately aligned with one of the target members and is in the fields of view of two imaging systems, the two imaging systems having respective axes that are oblique to each other and to the central axes of the two rod-form members, digitizing at least a part of the image of the first field of view to form first digital data, analyzing the first digital data to determine location of the first member in the first field of view, digitizing at least a part of the image of the second field of view to form second digital data, analyzing the second digital data to determine location of the first member in the second field of view, bringing about relative displacement of the first member and the array of target members according to the analysis of the first and second digital data in order to more closely align the two members, and bringing about relative displacement of the first member and the array of target members to place the first member at a position at which it is approximately aligned with another of the target members and is in the fields of view of the two imaging systems.

In accordance with a second aspect of the present invention there is provided apparatus for aligning first and second substantially parallel optical fiber segments, comprising a means for placing the first segment at a position at which it is approximately aligned with the second segment, first and second imaging systems having first and second fields of view respectively, each containing the first segment, the two imaging systems having respective axes that are oblique to each other and to the central axes of the two fiber segments and imaging the first and second fields of view respectively, a digitizing means for digitizing at least a part of the image of the first field of view and at least a part of the image of the second field of view, an analyzing means for analyzing digital data provided by the digitizing means to determine relative location of the first and second segments, and a displacement means responsive to the analysis means for bringing about relative displacement of the first and second fiber segments to a position in which they are in optically coupled relationship and thereafter bringing about relative displacement of the first and second fiber segments such as to break the optically coupled relationship.

BRIEF DESCRIPTION OF THE DRAWINGS

For a better understanding of the invention, and to show how the same may be carried into effect, reference will now be made, by way of example, to the accompanying drawings in which:

FIG. 4 is optical schematic of a viewing system that forms part of the apparatus.

DETAILED DESCRIPTION

Figure 1:
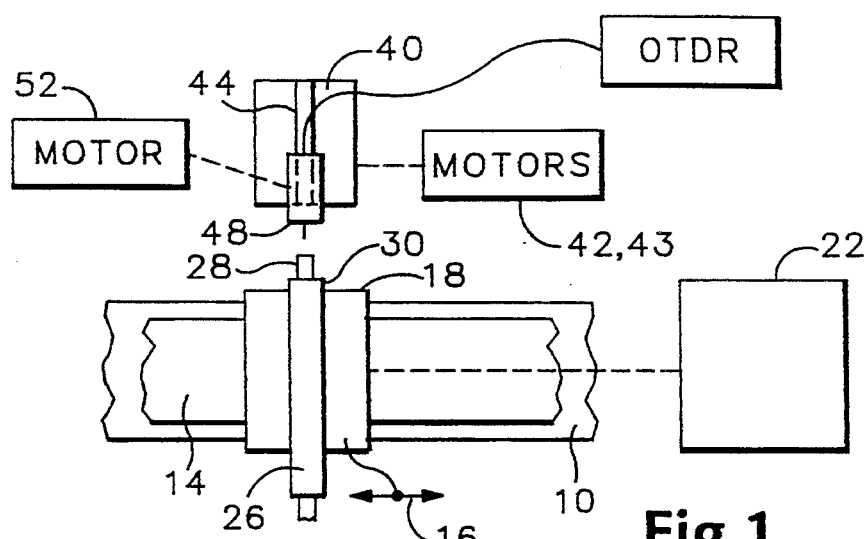
FIG. 1 is a partial plan view of apparatus for use in positioning an end segment of a buffer fiber in a desired spacial relationship with an end segment of a test fiber.
Figure 2:
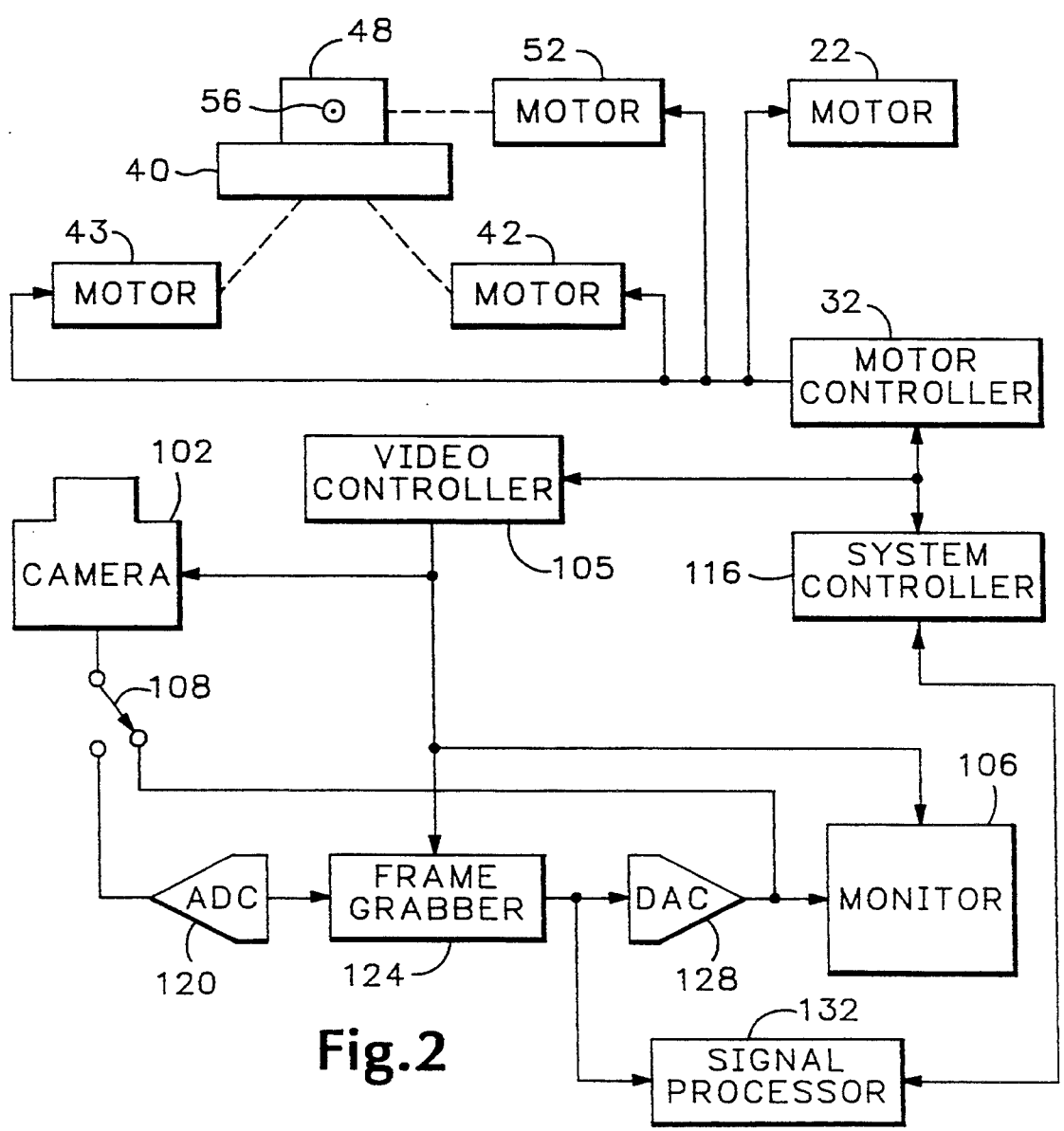
FIG. 2 is a block diagram of a part of the apparatus.
Figure 3:
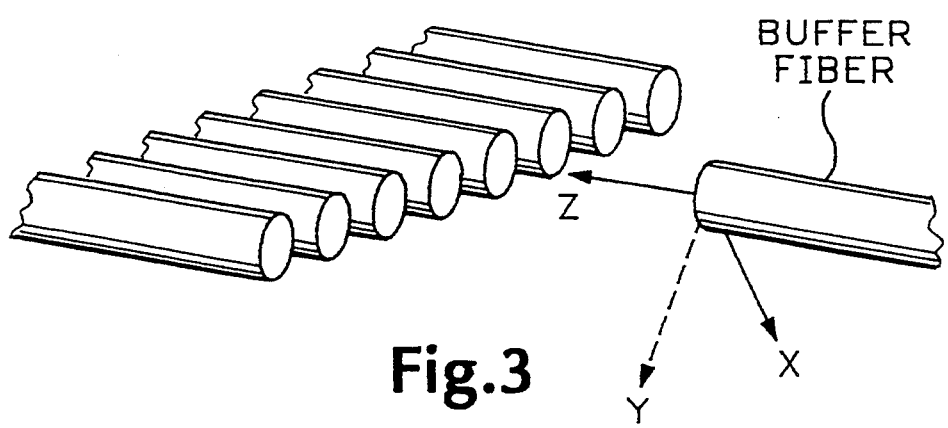
FIG. 3 is an enlarged perspective view of a detail of FIG. 1.

The apparatus shown in the drawings comprises a base 10 that carries a linear guide 14. The linear guide 14 defines a horizontal path of movement along an axis 16 and supports a carriage 18 for linear movement along the axis 16 under control of a stepping motor 22. A ribbon fiber clamp 26 is secured to the carriage 18 and holds an end segment 28 of a ribbon fiber so that the free end of the ribbon extend clear of the clamp. The end segment of the ribbon fiber is horizontal and extends perpendicular to the axis 16. As is well known, the ribbon fiber comprises multiple component fibers bonded together in spaced side-by-side relationship. The ribbon fiber is positioned in the clamp so that the central axes of the end segments of the component fibers are distributed along the axis 16.

The ribbon fiber is prepared for the test by placing the proximal end segment of the ribbon fiber in the clamp 26 so that the proximal end of the fiber projects from the clamp and one of the narrow sides of the ribbon is against a reference surface of the clamp. This reference surface is perpendicular to the axis 16 when the clamp is mounted to the carriage 18. The projecting end of the ribbon fiber is placed in a cleaving tool, by which the ribbon fiber is cleaved at a predetermined distance from the front surface 30 of the clamp 26, and the outer protective jacket is removed from the projecting end of the ribbon fiber, leaving an array of fiber end segments extending parallel to each other. The clamp 26 is mounted in the carriage 18 with the reference surface to the right as seen in FIG. 1. The carriage defines a seat for receiving the clamp 26, so that the reference surface of the clamp is at a controlled position relative to the carriage along the axis 16. The motor 22 drives the carriage 18 along the guide 14 in response to commands provided by a motor controller 32, which stores and continuously updates a carriage position variable representative of the position of the carriage 18 along the guide 14.

The physical characteristics of the ribbon fiber are specified to the controller. These characteristics are known from the manufacturer's specifications and include number of fibers, fiber diameter, and axis-to-axis spacing. Typically, the fiber diameter is about 125 μm and the axis-to-axis spacing is at least 200–210 μm and is normally about 250 μm. Based on the number of fibers and the axis-to-axis spacing, the controller is able to calculate the nominal position relative to the reference surface of the central axis of the proximal end segment of each component of the ribbon fiber.

The apparatus also comprises a platform 40 that is mounted for movement relative to the base 10 along X and Y axes that are perpendicular to each other and lie in a vertical plane that is parallel to the vertical plane that contains the axis 16. The X and Y axes are at 45° to horizontal. The platform 40 is driven along the X-axis by a stepping motor 42 and is driven along the Y-axis by a stepping motor 43, both of which operate under control of commands provided by the motor controller. The platform 40 is provided with a guide 44 that defines a linear path of movement along a Z-axis that is perpendicular to the X and Y axes, and a buffer stage 48 is mounted on the guide 44 and is driven therealong by a Z-axis motor 52, which also is controlled by the motor controller. The buffer stage carries a ferrule 56, which receives the distal end segment of the buffer fiber. When mounted in the ferrule, the distal end segment of the buffer fiber is aligned with the Z-axis.

The buffer stage 48 carries an optical system 60 (FIG. 4) for viewing the measurement zone in two directions at right angles. The optical system comprises a lens 84X whose optical axis is perpendicular to the Z-axis and is at 45° to horizontal. A mirror 88X receives the beam provided by the lens 84X and reflects it toward a beam splitter 92. The beam splitter also receives a beam provided by a lens 84Y and mirror 88Y, and combines the beams to provide a single beam that is imaged by a lens 96 in the image plane 100 of a CCD camera 102. The optical system 80 also comprises a light emitting diode (LED) 104X on the axis of the lens 84X and an LED 104Y on the axis of the lens 84Y. The LED 104X emits light in a narrow cone so that it illuminates the measurement zone without introducing light into the lens 84Y. Similarly, the LED 104Y illuminates the measurement zone without introducing light into the lens 84X. Thus, when only one LED is energized, the image in the plane 100 is representative of the field of view that is illuminated by that LED, whereas if both LEDs are energized, images of the two fields of view are superimposed in the plane 100.

Figure 5A:
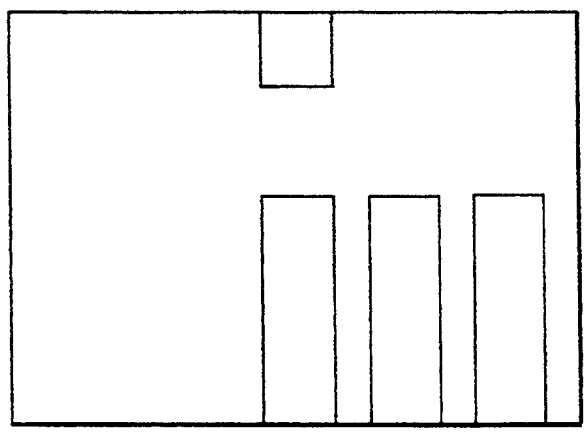
FIGS. 5A and 5B illustrate typical images formed by the viewing system.
Figure 5B:
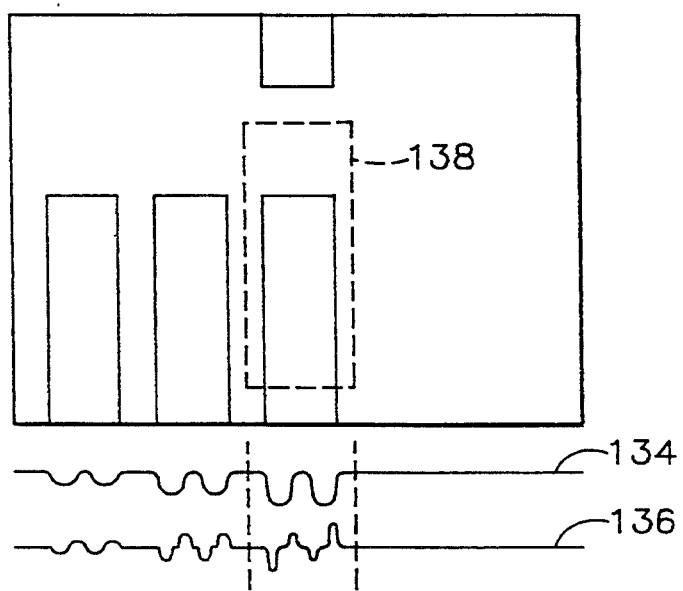

The CCD camera operates under control of a video controller 105 and provides a video signal representative of the distribution of optical intensity over the plane 100 to a monitor 106 by way of a switch 108. The images displayed by the monitor are typically as shown by FIGS. 5A and 5B, with the distal end of the buffer fiber projecting downwards at the top of each image and the proximal end of the ribbon fiber projecting upwardly at the bottom of the image. FIG. 5A (the A view) is typical of the image that is displayed when the LED 104Y is energized and the LED 104X is not energized, whereas FIG. 5B (the B view) is typical of the image that is displayed when the LED 104X is energized and the LED 104Y is not energized. When the buffer stage 48 is moved along the X-axis, the relative positions of the buffer fiber and test fiber change in the B view whereas the focus changes in the A view. Conversely, when the buffer stage is moved in the Y direction, the relative positions of the buffer fiber and test fiber change in the A view and the focus changes in the B view.

If the ribbon fiber comprises components 1-n, where the ith component is between the (i−1)th component and the (i+1)th component, and at least two components are to be tested, the components are tested in order from the lowest-numbered component to the highest-numbered component. Component 1 is considered to be the leading fiber and component n is considered to be the trailing fiber. The leading edge of a test fiber, as seen in the A view or B view, is considered to be the edge that bears the same spatial relationship to the test fiber as the leading fiber bears to the ribbon. Thus, in FIG. 5A, if the fiber at the left is the leading fiber, the left edge of that fiber is its leading edge and the right edge is its trailing edge. The leading edge of a test fiber may be said to upstream of the fiber's trailing edge.

During factory alignment, the ferrule is positioned so that the tip of the buffer fiber is substantially at the intersection of the axes of the lenses 84X and 84Y. The region surrounding the Z-axis in the vicinity of the tip of the buffer fiber constitutes the measurement zone of the apparatus.

The motor controller 32 and video controller 105 operate in response to commands provided by a system controller 116. In order to analyze the views provided by the camera 102, the system controller selects one or both of the LEDs 104 and sets the switch 108 to select the input of an analog-to-digital converter (ADC) 120. The ADC quantizes the video signal provided by the video camera 102 and a single frame of video (about 500 pixels wide by about 500 pixels high) is loaded into a frame grabber 124 under control of address words (H,V) provided by the video controller, where H represents location along an axis perpendicular to the Z-axis, V represents position along an axis parallel to the Z-axis, and signal amplitude represents intensity within the field of view. The frame grabber stores a rectangular array of pixel values, in which the location (H,V) of a given pixel corresponds to the location of the pixel in the field of view of the camera. The contents of the frame grabber are repeatedly read and converted to analog form by a digital-to-analog converter (DAC) 128, to provide a video signal to refresh the display provided by the monitor. Accordingly, the image displayed by the monitor is frozen.

A signal processor 132 analyzes the contents of the frame grabber under control of the system controller. In response to this analysis, the system controller provides commands to the motor controller, which in turn provides commands to the motors 42, 43, and 52 to adjust the position of the buffer stage 48 to bring the buffer fiber into coaxial alignment with a selected test fiber end segment.

The video controller 105 reads intensity values from the frame grabber employing address words (H,V) and supplies the intensity values to the signal processor 132.

The alignment is accomplished in two phases. The first phase is called PREVIEW. PREVIEW has the steps:
1. Set a derivative threshold value to a predetermined low value,
2. Selecting the A view, read a horizontal line of video data from the frame grabber (FIG. 5B, curve at a vertical position V such that it crosses the ribbon fiber,
3. Calculate an array of derivatives of the intensity of each pixel on the line of video data using a sliding five-point line-fit to the intensity data (curve 136),
4. Starting from the end of the video data line that is upstream of the expected leading edge of the first test fiber and moving downstream, examine the derivative data array to find the first point H for which the derivative
   (a) has the correct sign,
   (b) exceeds the preset threshold, and
   (c) is followed by a predetermined number of points for which the derivative has the same sign and is of sufficient magnitude,
5. Repeat steps 2–4 for the B view,
6. Set the derivative threshold to its higher default value and define a restricted search window 138 near the focus of the optical system,
7. Move the carriage 18 and the stage 40 to place the first test fiber near the focus of the optical system, based on the positions found in steps 4 and 5,
8. Repeat step 2; truncate the video data outside the search window 138; and with the remaining data, repeat steps 3 and 4,
9. Repeat step 8 for the B view.
10. Based on the values of H found for the A and B views, calculate the position of the leading edge of the selected test fiber and store in a PREVIEW location table,
11. Test the nominal structure of the ribbon fiber to determine whether there is another test fiber and, if so, proceed to step 12, otherwise end PREVIEW,
12. Move the carriage 18 and the stage 40 to place the next test fiber near the focus of the optical system, based on the ribbon structure and the location of the previous test fiber as calculated in step 10.
13. Loop back to step 8.

The edge-point-find filter (step 4 of PREVIEW) uses the derivative threshold value as one of its parameters. On the first pass, the first fiber might be out of focus, but there should be no significant intensity variations upstream of the leading edge of the first test fiber, so a low value of the threshold is used (step 1) to find the leading edge of the first fiber. On subsequent passes, when the data is representative of a nearly focused image, the threshold value is set to the higher default value (step 6) so that low level variations in intensity will not be interpreted as edge points.

Once PREVIEW has succeeded, all of the test fibers can be moved in turn sufficiently close to the focus of the optical system that they will fall the search window 138, which is substantially narrower than the field of view of the optical system.

When PREVIEW is completed, the buffer fiber end segment is aligned with each test fiber end segment in turn by use of an algorithm that is called ALIGNMENT. ALIGNMENT employs algorithms called VERTICAL EDGE FIND and HORIZONTAL EDGE FIND.

VERTICAL EDGE FIND has the following steps:

1. Read a horizontal line of video data from the frame grabber (FIG. 5B, curve 134) at a vertical position V between the upper and lower boundaries of the search window 138, which is defined on the basis of ribbon structure,
2. Truncate the video data outside the search window 138,
3. With the remaining data, calculate an array of derivatives of the intensity of each pixel on the segment of the horizontal line using a sliding five-point line-fit to the intensity data,
4. Starting from the edge of the search window that is upstream of the expected leading edge of the test fiber and moving downstream, examine the derivative data array to find the first candidate edge point H for which the derivative
   (a) has the correct sign,
   (b) exceeds a preset threshold, and
   (c) is followed by a predetermined number of points for which the derivative has the same sign and is of sufficient magnitude,
5. Repeat step 4, but starting from the position of the previously found candidate point. Build a table of left edge candidate points and a table of right edge candidate points.
6. Search the left and right edge candidate point tables for a single left/right pair of points that:
   (a) are matched in derivative magnitude within a predetermined percentage, e.g. the second candidate point has a derivative magnitude up to 130 percent that of the first candidate point, and
   (b) are separated by a nominal fiber diameter ± predetermined tolerance percentage, e.g. 10 percent.
7. When 6(a) and (b) are satisfied, proceed to step 8; if 6(a) and (b) cannot be satisfied, proceed to step 15.
8. Store the coordinates (H,V) for the left and right edge points in two arrays,
9. Read a horizontal line of video data at a vertical position V above the previous line,
10. Repeat steps 2–8 until step 6 fails,
11. Read a horizontal line of video data at a vertical position V below the first line,
12. Repeat steps 2–8,
13. Read a horizontal line of video data at a vertical position V below the previous line,
14. Repeat steps 2–8 and 13 until step 6 fails,
15. Pass the left and right edge point coordinate tables to calling routine.

The size of the search window is a default size based on ribbon geometry on the first time through the algorithm. On the second and subsequent passes, the search window is somewhat smaller because the fiber has been located with a reasonable degree of accuracy on the first pass.

HORIZONTAL EDGE FIND comprises the following steps:
1. Read a vertical column of video data from the frame grabber at a horizontal position H close to the center of the search window,
2. Truncate the video data outside the search window,
3. With the remaining data, calculate an array of derivatives of the intensity of each pixel using a sliding five-point line-fit to the intensity data.

4. Starting from the upper edge of the search window and moving downward, examine the derivative data array to find the first point V that
   (a) has the correct sign,
   (b) exceeds a preset threshold, and
   (c) is followed by a predetermined number of points with the same sign and of sufficient magnitude,
5. Store the coordinate pair (H,V),
6. Read a vertical column of video data at a horizontal position H upstream of the previous column,
7. Repeat steps 2–5 until step 4 fails,
8. Read a vertical column of video data at a horizontal position H downstream of the first column,
9. Repeat steps 2–5,
10. Read a vertical column of video data at a horizontal position H downstream of the previous column,
11. Repeat steps 2–5 and 10 until step 4 fails,
12. Pass the end coordinate table to calling routine.

ALIGNMENT has the following steps:
1. Based on the contents of the preview location table, position the carriage 18 so that a selected test fiber is near the focus of the optical system in each view,
2. Define a search window near the focal point of the optical system in each view, the window extending in the vertical direction from close to the buffer fiber to near the bottom of the field of view,
3. Employ VERTICAL EDGE FIND to calculate the coordinates (H,V) of points along the leading and trailing edges of the selected test fiber in the A view, construct a histogram of the horizontal coordinates of the (H,V) data for each edge, reject all coordinate pairs for which the H value differs by four or more pixels from the peak of the histogram.
4. If the number of points remaining for each edge exceeds a predetermined number, calculate best-fit lines for the remaining points, otherwise end ALIGNMENT and report failure,
5. Employ HORIZONTAL EDGE FIND to calculate the coordinates (H,V) of test fiber end points in the A view, construct a histogram of the vertical coordinate of the (H,V) data for the test fiber end, reject all coordinate pairs for which the V value differs by four or more pixels from the peak of the histogram,
6. If the number of points remaining exceeds a predetermined number, calculate a best-fit line through the remaining points, otherwise end ALIGNMENT and report failure,
7. Calculate the points (H1, V1) and (H2, V2) at which the end fit line found in step 6 intersects the edge fit lines found in step 4 and use the center ((H1+H2)/2, (V1+V2)/2) of this line segment as the location of the selected test fiber in the A view.
8. Repeat steps 3–7 for the B view,
9. If the selected test fiber is the first test fiber, calculate the distance between the center point found in step 7 and the end of the buffer fiber and proceed to step 10, otherwise proceed to step 11,
10. Advance the buffer stage 48 to a home position in which the end face of the buffer fiber is at a predetermined offset from the test fiber,
11. Employing the results found in step 7 for the A view and step 8 for the B view, calculate the horizontal displacement between the central axis of the test fiber and the center of the buffer fiber for each view, and if the distance is less than a predetermined distance for each view, end, otherwise shift the buffer stage along the X and/or Y axis by the amount of the horizontal displacement for that axis and loop back to step 3.

The size of the search window that is defined in step 2 of ALIGNMENT may be restricted after the first iteration of the algorithm on the basis of the data defining the approximate position of the end of the test fiber in order to reduce processing time.

When the buffer fiber has been aligned with the test fiber segment but is still offset from the test fiber segment along the Z-axis, a droplet of index matching oil is applied to the end face of the buffer fiber, for example using the technique described in the co-pending patent application Ser. No. 08/147,132 filed Nov. 02, 1993, (Attorney Docket P-188), the disclosure of which is hereby incorporated by reference herein. Based on the distance calculated in step 9 of ALIGNMENT and the movement in step 10 of ALIGNMENT, the buffer stage 48 is then moved along the Z-axis by an amount to place the end face of the buffer fiber a few micrometers from the end face of the test fiber. The index matching oil touches the end face of the test fiber segment and provides optical coupling between the two fibers. The test fiber is tested using the OTDR. When the test is complete, the buffer stage is returned to its home position and the alignment algorithm is repeated for the next test fiber.

Algorithms similar to VERTICAL EDGE FIND and HORIZONTAL EDGE FIND are used to locate the end of the buffer fiber during factory alignment, as mentioned above. The line that is read during step 2 of PREVIEW is sufficiently low that it does not cross the buffer fiber, and the search windows that are defined during PREVIEW and ALIGNMENT do not contain the buffer fiber.

It will be appreciated that the invention is not restricted to the particular embodiment that has been described, and that variations may be made therein without departing from the scope of the invention as defined in the appended claims and equivalents thereof. For example, the invention is not restricted to use of linear guides for movement of the buffer stage in the X and Y directions, and movement along arcuate paths, as described in the co-pending application, may be employed instead. Further, if linear paths of movement are employed, it is not essential that the paths be orthogonal. Normally, the linear paths will be perpendicular to the optical axes of the imaging systems. It is not essential that during VERTICAL EDGE FIND or HORIZONTAL EDGE FIND that each line (or column) of video data within the search window be tested, since it may be satisfactory to skip one or more lines (or columns) between each two tested lines (or columns). It is not essential that the protocol defined in VERTICAL EDGE FIND or HORIZONTAL EDGE FIND for selecting the next line or column to be tested should be followed. For example, in VERTICAL EDGE FIND it would be possible to start at the bottom of the search window and work up to the end of the test fiber, at which point step 6 will fail.

We claim:
1. A method of aligning a first rod-form member successively with a plurality of target rod-form members that are arrayed substantially parallel to each other, said method comprising:
   (a) placing the first member at a position at which it is approximately aligned with one of the target members and is in the fields of view of two imaging systems, the two imaging systems having respective axes that are oblique to each other and to the central axes of the two rod-form members, (b) digitizing at least a part of the image of the first field of view, (c) analyzing digital data obtained in step (b) to determine location of the first member in the first field of view, (d) digitizing at least a part of the image of the second field of view, (e) analyzing digital data obtained in step (d) to determine location of the first member in the second field of view, (f) bringing about relative displacement of the first member and the array of target members according to the analysis in steps (c) and (e) in order to more closely align the two members, (g) bringing about relative displacement of the first member and the array of target members to place the first member at a position at which it is approximately aligned with another of the target members and is in the fields of view of the two imaging systems, and (h) repeating steps (b)–(f).

2. A method according to claim 1, wherein the first rod-form member is a distal end segment of a buffer fiber and the target rod-form members are components of a proximal end segment of a ribbon fiber, and the method comprises, between steps (f) and (g):

bringing about relative axial displacement of the buffer fiber and the ribbon fiber to bring the buffer fiber and one component of the ribbon fiber into optically coupled relationship, employing an OTDR that is coupled to a proximal end of the buffer fiber to launch optical power into said one component by way of the buffer fiber and measure return optical power received from said one component by way of the buffer fiber, and bringing about relative axial displacement between the first member and the ribbon fiber to break the optically coupled relationship.

3. A method according to claim 1, wherein the axes of the two imaging systems are perpendicular to the central axes of the two rod-form members, and step (f) comprises bringing about relative displacement of the first and second members perpendicular to the axes of the imaging systems.

4. A method according to claim 1, wherein step (c) comprises calculating a first number representative of perpendicular distance between the axis of the first member and the axis of the second member in the image of the first field of view, step (e) comprises calculating a second number representative of perpendicular distance between the axis of the first member and the axis of the second member in the image of the second field of view, and step (f) comprises displacing the first member perpendicular to the axes of the first and second imaging systems according to the analysis in steps (c) and (e) if either number exceeds a predetermined limit, 5. A method according to claim 4, further comprising repeating steps (b)–(e).

6. A method according to claim 1, comprising:

(g) analyzing digital data obtained in at least one of steps (b) and (d) to determine parallel distance between the first and second members.

7. A method according to claim 6, comprising:

(h) employing said parallel distance to define a restricted region of the first field of view and the second field of view, (i) digitizing the restricted region of the image of the first field of view, (j) analyzing digital data obtained in step (i) to determine location of the first member in the first field of view, (k) digitizing the restricted region of the image of the second field of view, (l) analyzing digital data obtained in step (k) to determine location of the first member in the second field of view, and (m) bringing about relative displacement of the first and second members according to the analysis in steps (j) and (l).

8. A method according to claim 6, wherein step (g) is performed before step (f) and step (f) comprises bringing abut relative displacement of the two members in order to more closely align the two members and then bringing about relative displacement of the two members to bring them to a position in which they are in close end-to-end but non-contacting relationship, and subsequently bringing about relative displacement of the two members to separate them in the axial direction.

9. A method according to claim 8, wherein the first rod-form member is a distal end segment of a buffer fiber and the target rod-form members are components of a proximal end segment of a ribbon fiber and the method comprises applying a droplet of index-matching liquid to the distal end face of the buffer fiber before axial displacement toward the ribbon fiber.

10. A method according to claim 1, wherein step (b) comprises resolving the image of the first field of view into an array of pixels, forming a video signal of the image of the first field of view, and digitizing the video signal to provide an intensity value for each pixel, and step (c) comprises analyzing the intensity values to identify pixels at which the gradient of intensity exceeds a threshold value.

11. Apparatus for aligning first and second substantially parallel optical fiber segments, comprising:

a means for placing the first segment at a position at which it is approximately aligned with the second segment, first and second imaging systems having first and second fields of view respectively, each containing the first segment, the two imaging systems having respective axes that are oblique to each other and to the central axes of the two fiber segments and imaging the first and second fields of view respectively, a digitizing means for digitizing at least a part of the image of the first field of view and at least a part of the image of the second field of view, an analyzing means for analyzing digital data provided by the digitizing means to determine relative location of the first and second segments, and a displacement means responsive to the analysis means for bringing about relative displacement of the first and second fiber segments to a position in which they are in optically coupled relationship and thereafter bringing about relative displacement of the first and second fiber segments such as to break the optically coupled relationship.

12. Apparatus according to claim 11, comprising a camera means for receiving the images of the first and second fields of view and providing a video signal, and wherein the digitizing means comprises a means for quantizing the video signal.

* * * * *